UNITED STATES PATENT OFFICE.

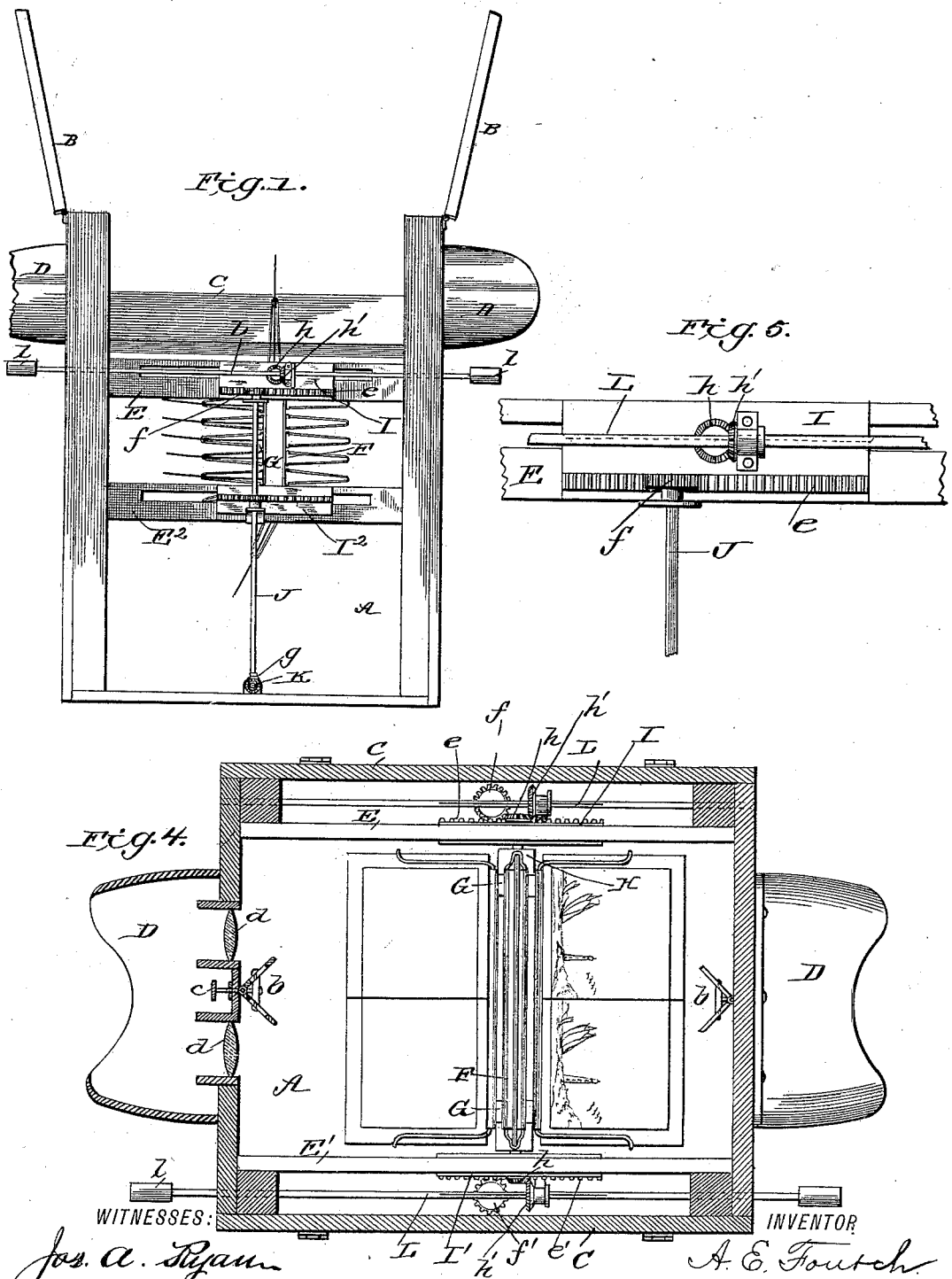

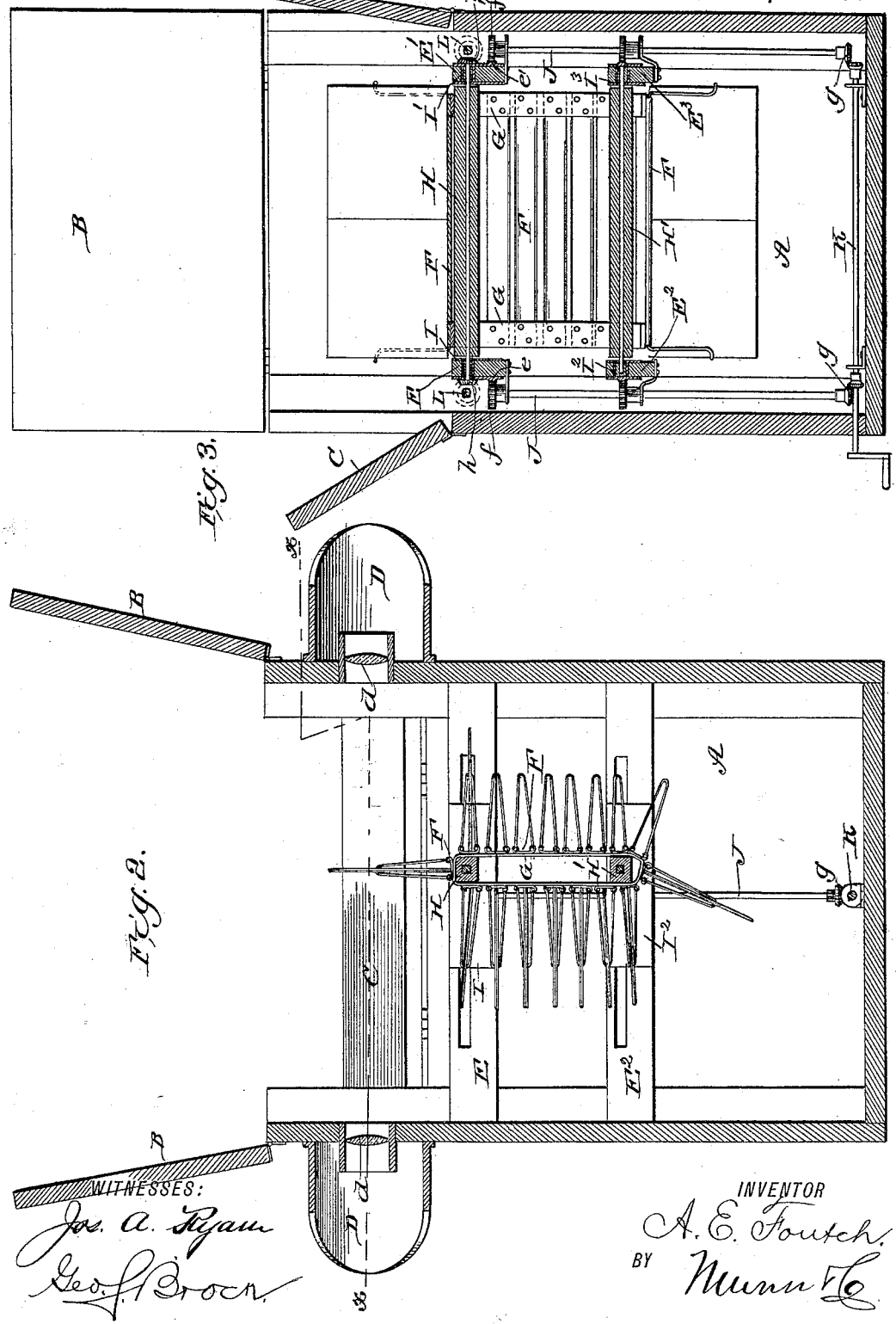

ADELBERT ELSWORTH FOUTCH, OF NEW ALBANY, INDIANA.

STEREOSCOPE.

SPECIFICATION forming part of Letters Patent No. 399,863, dated March 19, 1889.

Application filed July 26, 1888. Serial No. 281,148. (No model.)

*To all whom it may concern:*

Be it known that I, ADELBERT ELSWORTH FOUTCH, of New Albany, in the county of Floyd and State of Indiana, have invented a new and useful Improvement in Stereoscopes, of which the following is a specification.

My invention relates to that class of stereoscopes in which the views are arranged in an endless series to be successively brought into the focus of the lenses; and it consists in certain features of improvements, which I will now proceed to fully describe.

Figure 1 is a side elevation with a side panel of the case removed. Fig. 2 is a vertical longitudinal section. Fig. 3 is a vertical transverse section, and Fig. 4 is a horizontal section through line $x\,x$. Fig. 5 is a side view, in detail, of the devices for adjusting the views to or from the observer.

In the drawings, A represents the box or case, which may be made of any suitable size or material. This box has at the top two hinged lids or covers, B B, and at the sides has also two hinged doors, C C, which, when open, drop down below the position of the picture to be viewed. At each end wall of the box, about on a level with these side doors, are hoods D D, which surround the lenses $d\,d$ and form eye-shades to exclude the light laterally from the eyes. Between the two lenses is a septum or partition, $b$, formed by divergent wings, which prevent the margin of one side of the view from being visible through the other lens. This septum has its two wings hinged together at the apex, and they are adjusted to or from each other by a set-screw, $c$.

E E' E² E³ are four horizontal bars provided with longitudinal slots extending across the box, and forming guides in which slide the series of views to bring them to such distance from the lenses to adapt them to the proper focus for the eye. The views are arranged in a series of holders, F, which are attached transversely to two endless belts or webs, G G, of flexible material, which pass around an upper roller, H, and a lower roller, H'. By the intermittent rotation of these rollers the views held in the holders may be successively brought to the vertical position in line with the lenses for inspection. To effect the adjustment and rotation of this view-holder, the rollers are journaled in plates I I' I² I³, which slide horizontally in the slots of bars E E' E² E³. These plates I I' I² I³ have horizontal toothed racks $e\,e'$ formed in them, into which mesh pinions $f\,f'$ on a vertical shaft, J, on each side, which turns in fixed bearings, and at its lower end is connected by bevel-gears $g$ to a horizontal handle-shaft, K, with a knob on its end for adjusting the same. When this handle-shaft is turned, it will be seen that the whole series of views is adjusted through the racks and pinions horizontally to or from the lenses to secure the proper focus. To provide means for rotating the views consistently with the above adjustment, a small bevel-gear, $h$, is fixed rigidly upon the axis of the top roller and is made to engage with another bevel-gear, $h'$, which is mounted upon a shaft, L, so as to rotate rigidly therewith, but slide freely thereon. This sliding gear $h'$ is swiveled in supports, so as to remain always in mesh with the other bevel-gear. The shaft L may be square, as shown, and the opening through the bevel-gear $g'$ made to correspond; or they may be connected by a feather or spline. The shaft L protrudes through the side of the box and terminates in a knob, $l$, by turning which the views are successively brought up to the highest vertical position to be inspected. This feed adjustment, it will be seen, is entirely consistent with the adjustment for focus through the agency of the bevel-wheel sliding on the square shaft L, for the sliding bevel-wheel travels with the sliding plates and view-holders over the shaft L. The object in providing the side doors, C C, is to allow the access of light laterally to the views, thus permitting of a greater degree of illumination of the picture.

Having thus described my invention, what I claim as new is—

1. The combination, in a stereoscope, of an endless series of view-holders distended upon rollers, a set of journal-plates arranged to slide horizontally in guides and carrying the said rollers, toothed gears for adjusting the plates horizontally, and a sliding bevel-gear connection with the roller for rotating the series of view-holders, as described.

2. The combination, with the box or case, of the horizontally-slotted guide-bars E E' E² E³, the endless view-holder and rollers distending same, the plates I I' I² I³, carrying the journals of the rollers and provided with toothed rack-bars, the shaft J, with pinions $f f'$ and turning handle, the angular adjusting-shaft L, and a pair of bevel-gears connecting one of the rollers to the shaft J by a sliding connection, as described.

3. The combination, with a stereoscope having a series of rotary adjustable view-holders, of a case having a hinged top, and hinged side pieces, C C, for admitting light laterally to the views, substantially as described.

ADELBERT ELSWORTH FOUTCH.

Witnesses:
ARTHUR E. GRIFFIN,
M. D. CONDIFF.